UNITED STATES PATENT OFFICE.

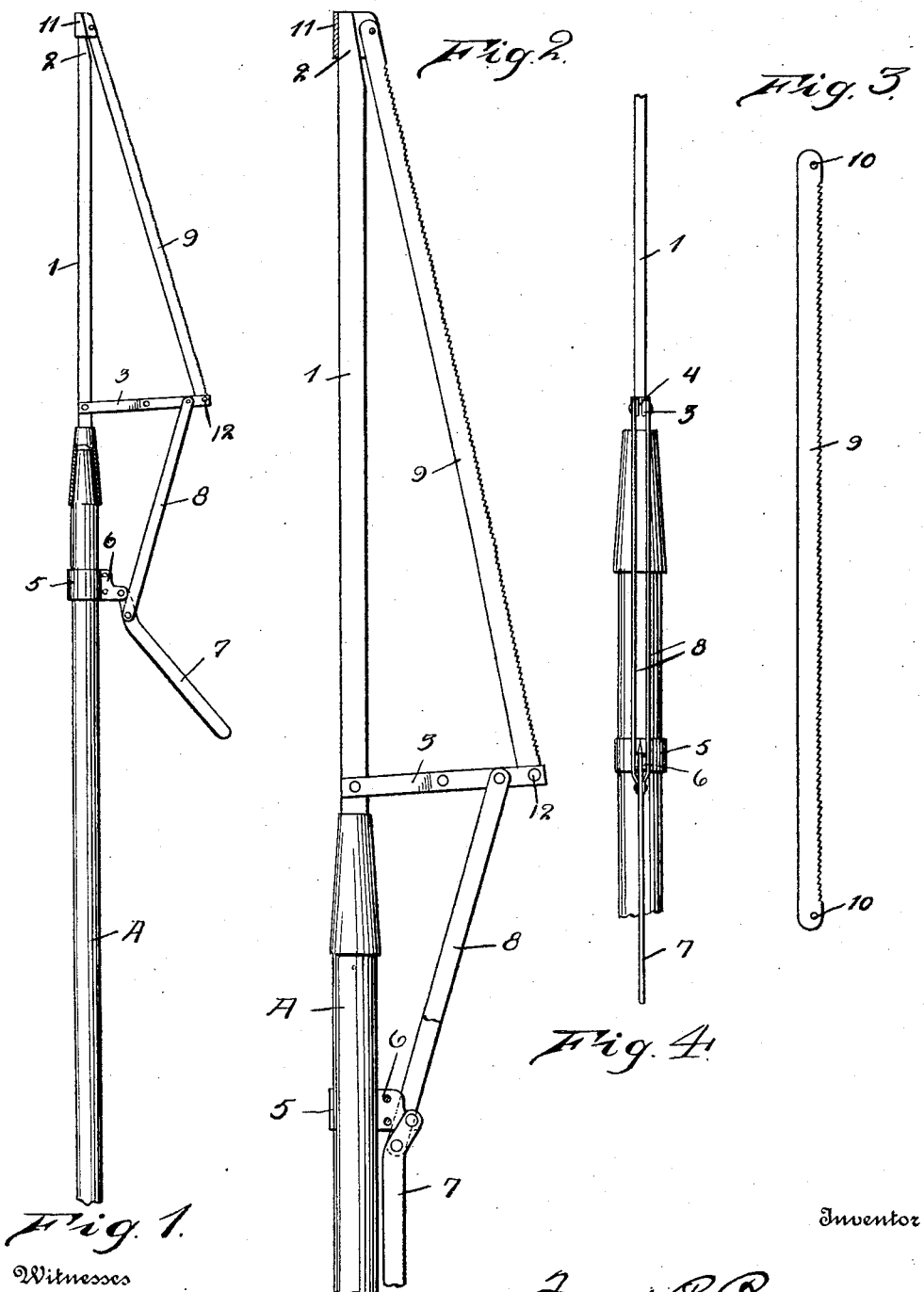

FRANK P. BREWER, OF ANGOLA, INDIANA.

PRUNING-SAW.

1,032,987.

Specification of Letters Patent.

Patented July 16, 1912.

Application filed February 14, 1912. Serial No. 677,451.

*To all whom it may concern:*

Be it known that I, FRANK P. BREWER, a citizen of the United States, residing at Angola, in the county of Steuben and State of Indiana, have invented certain new and useful Improvements in Pruning-Saws, of which the following is a specification.

My invention relates to saws used as implements to prune trees, the operator standing on the ground and the saw being mounted on a long handle to enable him to reach the limbs or branches of the tree that are required to be cut off.

In a patent granted to me on February 21, 1893, No. 491,980, is shown and described a pruning saw on which my present invention is an improvement. The saw shown in the patent referred to proved to be unsatisfactory for the reason that the saw blade was secured to the wooden pole or handle which would become bent by the strain put upon the blade in stretching it to secure the proper tension for effective work, and furthermore, the cutting edge being in a straight line the saws would not cut through the entire upward stroke of the blade, but would bind making it necessary at times to withdraw the blade from the kerf and start it over again on a down stroke. I have overcome these objections by my present construction hereinafter described and claimed, and have illustrated my improved pruning saw in the drawings hereto annexed in which—

Figure 1 is a side view of my improved pruning saw showing it mounted on the upper end of a pole or handle, Fig. 2, an enlarged detail view of the saw frame showing the saw blade under tension, Fig. 3, a view of the blade removed from the frame, and Fig. 4, a detail view of the arm that applies tension to the blade.

In the drawings similar reference characters will be used to designate corresponding parts in the several views.

A indicates a pole or handle, such as is commonly used on pruning implements, and 1 a flat steel bar, secured in its upper end, and having its free end tapered as shown at 2.

3 indicates an arm pivotally secured to bar 1 adjacent to the end pole A and having its free end slotted as shown at 4.

5 indicates a ring secured near the upper end of pole A and having an ear 6 extending therefrom on which is fulcrumed a lever 7, and 8 indicates a link connecting lever 7 and arm 3.

The saw blade 9 has a hole 10 at each end adjacent to its cutting edge.

11 indicates a loop or socket pivotally secured to one end of the blade 9, said loop or socket being shaped to fit the tapered end of steel bar 1 when the saw is placed in position, the other end of the blade being mounted in the slotted end 4 of pivoted arm 3 and secured therein by means of a bolt or rivet 12 engaging holes in said arm and the hole 10 in the end of the blade.

By locating the holes 10 adjacent to the cutting edge of the saw it will be apparent that when tension is applied to the blade by means of lever 7 the portion of the blade adjacent to the cutting edge is stretched, while the portion adjacent to the back edge of the blade is compressed from the two ends toward the middle of the blade, the effect being to raise the cutting edge slightly upwardly from the two ends to its middle giving the blade an outwardly curved or convex contour longitudinally. This convexity of the blade is of great advantage and relieves the implement of one of the objections to the patent hereinbefore referred to, that of binding in the kerf in making an upward stroke, as the binding takes place after the middle of the blade is reached when the strain is more and more on the lower end of the blade, the curved feature making the cut from the middle of the blade to the finish of the stroke down hill relative to the direction of the motion of the blade. Furthermore, by mounting the blade on a flat steel bar instead of the wooden pole, a greater tension can be applied to the blade and when the tension is relieved the bar will return to its normal position, also the bar being comparatively thin makes it possible to cut off a limb close to the trunk where the wound will more quickly and effectively heal, and not become an unsightly blemish on the tree.

Having thus described my invention what I claim is—

1. In a pruning saw, a fixed metallic supporting bar, a saw blade detachably connected therewith, said saw blade being provided at its ends with holes disposed in proximity to the cutting edge and spaced from the rear edge of the blade, and means engaging said holes to apply tension to the blade to cause the same to bend outwardly from its ends to its middle.

2. In a pruning saw, a pole, a steel bar secured in the end of said pole and having its outer end tapered, an arm pivotally mounted on the bar, a lever pivotally mounted on the pole, a link connecting the arm and lever, and a saw blade removably secured to the tapered end of the steel bar and to the arm.

3. A pruning saw comprising a pole, a steel bar secured in the end of the pole and having a tapered outer end, an arm pivotally secured to said bar and having a slotted outer end, a lever fulcrumed on the pole, a link connecting the lever and arm, a saw blade having holes in its ends adjacent to the cutting edge of the blade, a socket member pivotally secured in the hole at one end of the blade and adapted to fit the tapered end of the bar, the other end of the blade being adapted to engage the slot in the outer end of the arm, and means to secure the blade in the slot in the arm.

In testimony whereof I hereto affix my signature in the presence of two witnesses.

FRANK P. BREWER.

Witnesses:
   HARRY E. WILDER,
   HARLIE BARNES.

---

Copies of this patent may be obtained for five cents each, by addressing the "Commissioner of Patents, Washington, D. C."